United States Patent [19]

Wren et al.

[11] 4,184,687

[45] Jan. 22, 1980

[54] ELECTRICAL CONTROL SYSTEM FOR THE MOVEMENT OF THE PICKUP ARM OF A DISC-RECORD PLAYER

[75] Inventors: John P. Wren, Swindon; Ian W. Buckner, Lea, near Malmesbury, both of England

[73] Assignee: Plessey Handel und Investments AG, Zug, Switzerland

[21] Appl. No.: 900,145

[22] Filed: Apr. 26, 1978

[30] Foreign Application Priority Data

Apr. 28, 1977 [GB] United Kingdom ............... 17708/77

[51] Int. Cl.² .......................................... G11B 17/06
[52] U.S. Cl. ............................... 274/13 R; 274/23 R; 318/313; 318/326
[58] Field of Search ................. 274/13 R, 15 R, 23 R, 274/23 A; 318/313, 326

[56] References Cited

U.S. PATENT DOCUMENTS

| 3,937,903 | 2/1976 | Osann | 274/15 R |
|---|---|---|---|
| 3,993,315 | 11/1976 | Hansen et al. | 274/23 A |
| 4,076,258 | 2/1978 | Wren | 274/23 R |

FOREIGN PATENT DOCUMENTS

| 1954673 | 5/1971 | Fed. Rep. of Germany | 274/23 R |
|---|---|---|---|
| 2413972 | 3/1973 | Fed. Rep. of Germany | 274/23 R |

*Primary Examiner*—John W. Shepperd
*Attorney, Agent, or Firm*—Fleit & Jacobson

[57] ABSTRACT

Electrical equipment for controlling an electric motor for the horizontal movement of the pickup member of a disc-record gramophone towards and away from the center of the gramophone turntable comprises position-selector means which, when set to any one of a number of predetermined positions of the pickup member, start the motor and emit a normally constant speed-reference signal controlling the motor speed and, upon receipt of a position-identifying signal from the selected position, cause the motor to be de-energised, thus terminating the motor-driven movement of the pick-up member, individual position-detector means, each so constructed as to perform the dual function of emitting such position-identifying signal and of varying the normally constant reference signal in accordance with the residual distance of the pick-up member from the accurate location of the selected position, thereby varying the motor speed so that the position-detector means work, in conjunction with the motor, as an approach servo.

2 Claims, 1 Drawing Figure

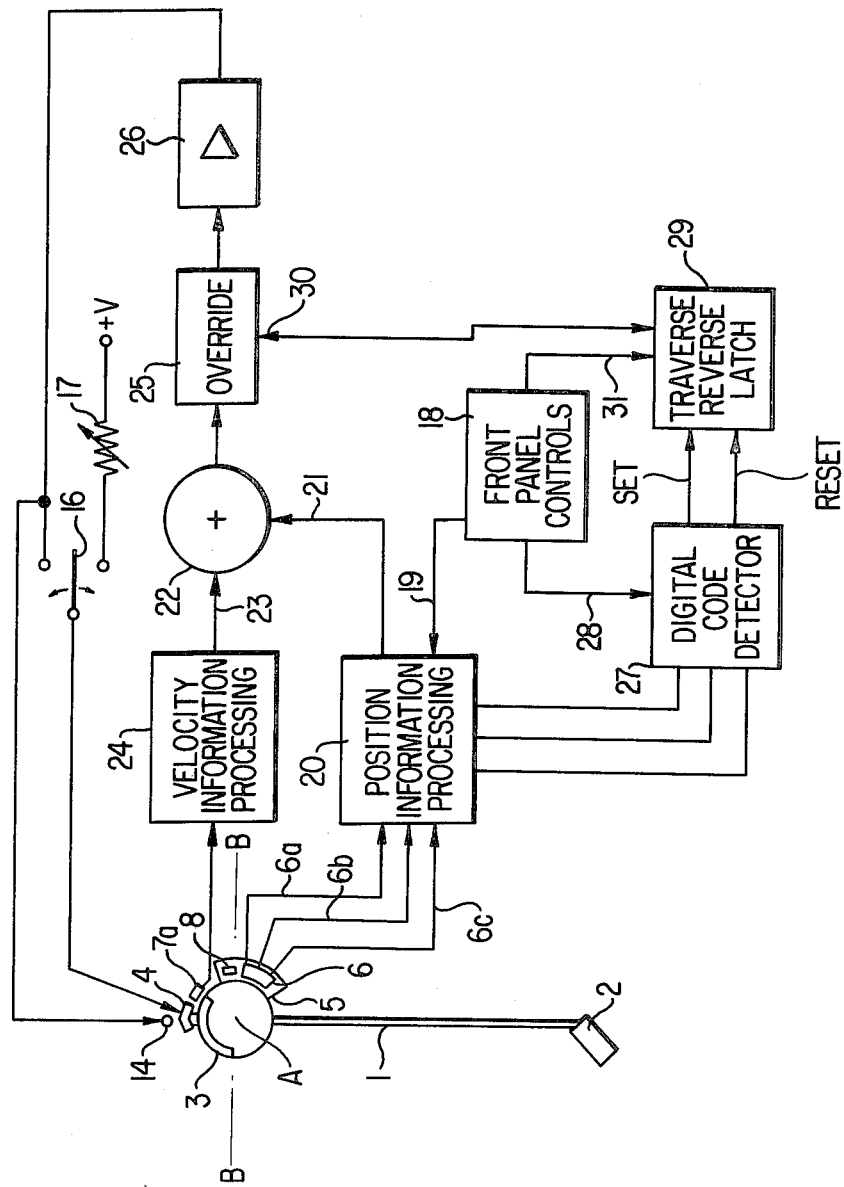

ELECTRICAL CONTROL SYSTEM FOR THE MOVEMENT OF THE PICKUP ARM OF A DISC-RECORD PLAYER

This invention relates to electrical equipment system for controlling and producing the movement of the pickup arm of a disc-record player, and although it was originally developed for use with the pickup-arm displacing device which forms the subject of our co-pending U.S. application Ser. No. 840,366 which corresponds to British patent application Ser. No. 42212/76, the present invention is not limited to use with this particular device but can be alternatively used in conjunction with other electromotive means for the pickup arm.

The invention has for an object to provide improved electrical equipment for controlling and producing the horizontal and vertical movements of the pick-up member of a disc-record player with the use of motor means independent of the drive of the record turntable, and to ensure high precision in placing the pick-up member on to a record at a predetermined or selected radial distance from the axis of the turntable.

According to the invention electrical equipment for the horizontal movement towards and away from the turntable axis of a disc-record player having a record turntable and a pick-up member for co-operation with a record on the turntable, and for the up-and-down movement of the said pick-up member, comprises a variable-speed electric motor means which, when connected to a source of electric power, produces such horizontal movement of the pick-up member in one or the other of two opposite directions, according to the manner of its connection to such source; a motor-energisation circuit for establishing such connection of said motor to the power source; position-detector means, controlled by the position of the pick-up member resulting from such horizontal movement and operative to respectively produce at each of a plurality of such positions an electric output signal indicative of the respective arm position; position-selector means operative when set for a selected one of said positions of the pick-up member, to complete the motor-energisation circuit for causing said motor means to produce horizontal movement of the pick-up member towards the selected position, and a speed-reference signal of normally constant magnitude, said position-selector means being so associated with said detector means that the output signal of the detector means will produce de-energisation of the motor-energisation circuit when said pick-up member is in said selected position; motor-speed detector means producing a speed signal varying in accordance with the speed of the motor means, motor-speed control means differentially responsive to said motor-speed signal and said speed reference signal and operative to control the motor speed and thus the velocity of the horizontal movement of the pick-up member produced by the motor means, said position-detector means being of the kind which when the pick-up member, in its approach to a selected position, has arrived within a pre-determined distance range from that position, causes said speed reference signal to decrease and thus reduce said velocity in accordance with the decreasing distance from the selected position so that the position-detector means form, with the motor means and the velocity detector means, an approach servo; and electrically operated arm-lifting means operative to ensure that the pick-up member is in a raised position while the motor means is energised from such source to produce such horizontal movement, and to allow the pick-up member to be deposited on to a record resting on the turntable, or to other support means, when such horizontal movement has been stopped at such selected position.

Conveniently the position-detector means are of the kind which, within said predetermined range, varies the speed-reference signal in accordance with a linear function of the algebraic value of the distance of the pick-up member from the selected position.

In order that the invention may be more readily understood, an embodiment will now be described with reference to the accompanying drawing is a diagrammatic plan view of a gramophone pickup arm which is provided with one form of control equipment according to the present invention including a position and velocity-sensing means, this plan view being shown together with a block diagram of one form of suitable electric circuit.

Referring now first to the drawing, the pickup arm 1 of a disc-record player, which carries a playing stylus 2, is mounted in the player for horizontal movement about a vertical axis A for movement across the record turntable, not shown, of the disc-record player and for pivotal movement about a horizontal axis B to lift the stylus 2 clear of the surface of any records resting on the turntable. In order to enable the arm to be moved electrically towards the turntable centre prior to the deposition of the stylus, and away from the turntable centre after the termination of the play of a record, an electrodynamic motor means is provided. The latter comprises a permanent magnet 3 which is mounted in the pickup-arm structure for joint movement with the arm about the axis A and has north and south poles spaced in the circumferential direction, and a coil winding 4, having two sets of axial conductor elements which are respectively crossed by the magnetic field of the two poles of the permanent magnet 3 in such a manner that d.c. energisation of the coil produces in each said set a torque in the same direction, with the torque produced at each set tending to move the arm about the axis A in one or the other direction according to the polarity of the d.c. applied as is explained in more detail in our above-mentioned co-pending U.S.A. application Ser. No. 840,366. Also mounted for joint rotation with the arm about the axis A is a light-control member, for example a mask 5 of part-circular shape, which is interposed between a light source, arranged at the back of the mask and therefore not visible in the drawing, and a photo-detector member 6 positioned in front of the mask as shown in the drawing. The mask 5 may be formed with a number of position-indicator apertures arranged to allow when the arm is near any one of the number of predetermined positions light from the source to reach a photoelectric element of the member 6 the amount of light reaching such element rising to a maximum when, as the arm reaches said predetermined position, the aperture becomes accurately aligned with the photoelectric element. The passage of the individual apertures past the element will then result in the production of consecutive pulses in an output line. However, in the construction shown in the drawing, a single slot 8 in the mask 5 is arranged to move successively past separate photo-detectors of the detector member 6. Three detectors are shown, each having a separate output line 6a, 6b and 6c respectively, and the individual detectors are so placed as to become successively illuminated as the arm 1 moves past their respectively associated selection positions. In practice any desired number of detectors may be provided to correspond with the number of positions in which the arm is required to be stopped automatically when moved by the motor. An indicator coil 7a is so arranged as to be intersected by the magnetic field from the magnet 3 and thus to produce a voltage dependent upon the arm velocity.

The motor-coil circuit is arranged, similarly as in our said co-pending U.S. application Ser. no. 840,366, to include electromagnetic means, not illustrated in the present specification, which operate to raise the pick-up arm out of contact with the surface of the turntable or any record resting thereon, throughout any time in which the motor is energised to move the arm about its vertical swivel axis, and a change-over switch 16 which, when the winding 4 is not energised with arm-actuating current, and the pickup arm is lowered to its playing position, so connects the winding 4 that this winding is fed from a power source V+, via an adjustable resistor 17, with a relatively weak current as required for balancing the so-called skating force of the pickup arm. The control circuit for the arm actuation, as illustrated in the drawing is more particularly intended for use in cases in which it is desired for the arm normally to be lifted to terminate playing of the record, and to commence its return movement at a point which is predetermined for each record size, and which may, for example, be different for the playing of the smallest records to be played (7" records) from the point applicable to records of the larger sizes. The circuit includes a front panel 18 equipped with manually operable selector elements, which are set to respectively determine for example, whether manual or automatic play is desired, the size of the records to be played and thus the point at which the stylus is to be deposited, and to initiate, when required, a so-called reject function causing the stylus to be lifted wherever it is situated and moved outwardly to a point outside the diameter of the largest records, etc. A signal corresponding to the selected record size is transmitted via a line 19 to a position-processing unit 20, which receives, through the lines 6a, 6b, 6c, the position-information output of the position detector 6 and which is conditioned, by the selection signal transmitted via the line 19, to respond only to that output signal of the detector member 6 which is emitted at the selected arm position. The unit 20 is constituted in a well known manner to supply, until this selected signal is received a voltage for inward movement of the arm to an input 21 of an adding circuit 22, whose output is applied, via an over-ride unit 25, whose purpose and operation will become clearer further below, and a servo-amplifier 26, to the winding 4. To a second input 23 of the adding circuit 22 the velocity output from velocity detector 7a, processed if necessary by a velocity-information processing unit 24 for example to match the voltage range supplied to the adding circuit 22 by the position-information processing unit 20 during the final approach to the accurate location of a selected position, is applied as a negative feedback in order to control the velocity of the movement of the pickup arm produced by energisation of the winding 4. The front-panel unit 18, the position-processing unit 20, the adding circuit 22, and the velocity-information processing unit 24, as well as the over-ride unit 25, the digital-code detector 27, and the traverse-reverse latch unit 29, which are mentioned further below, do not form part of the present invention and have therefore not been described in detail, suitable units being either commercially available or readily made-up by a person skilled in the art. The position detector provided in the member 6, in contrast to a 2-state ON/OFF device, responds to the presence of the pick-up member within a predetermined narrow zone at both sides of a selected position, by varying, the input 21 applied via the line 7b to the adding circuit 22, and thus the arm velocity in accordance with a linear function of the remaining distance from the selected position and reversing the polarity of the input 21 and thus the direction of the arm movement if the arm for any reason is taken past the correct set-down position. The device therefore works, within said predetermined zone about the set-down position, as an approach servo, whereby high accuracy and repeatability of the set-down operation is achieved. Aproach-servo devices are also well known, and it is also known to utilise for this purpose the progressive increase in the light reaching a photo cell as an aperture in a mask approaches alignment with a light source for illumination of a photo-resistor. The novel feature of the present invention consists in the dual use of the signal from the position detector for each selected position, one use being to distinctively identify the individual selection positions in order to replace, in the final approach to a selected position, the previously operative velocity control producing a constant velocity, by the approach-servo control, and the second use being for the subsequent control of the velocity in the approach-servo fashion to ensure that the arm will stop precisely at the selected position. When the arm has thus come to rest at the selected position, the arm-lifting solenoid 14 is de-energised in accordance with normal practice, allowing the pickup 2 to be deposited on to the record to be played; during this play the further inward movement of the arm is controlled by the recording groove of the record.

In order to ensure that the pickup is lifted when the end of the recording groove is reached, the position-information processing unit 20 is arranged to supply at each of the points corresponding to the end of the recording groove for the various record sizes, digital signals which are distinctive for each of the positions in question. These digital signals are fed to a digital-code detector unit 27, which in a well-known manner is so conditioned by a code-select signal which is supplied to an input 28 from the front-panel control unit 18 in accordance with the size of records selected for play, that when the code corresponding to the end-of-play position for the record side in question is received from the position-information processing unit 20, the unit 27 will transfer its output from the SET input to the RESET input of a traverse/reverse-latch unit 29. As a result of this the latter will apply an override voltage to an input 30 of the above-mentioned override unit 25, thus causing the override unit to reverse the direction of the energising current for the motor winding. The consequent operation of the pickup arm in the reverse, i.e. in the outward direction then continues until the digital-code detector unit 27 receives that digital code which indicates that the pickup arm 1 has returned to its outermost position, clear of the maximum diameter of any records on the turntable. A similar reversal of the latch unit 29 takes place via an input 31 when a reject operation is initiated by appropriate actuation of a REJECT-control member on the panel 18. The means employed to perform these end-of-play operations are well known in the art and have therefore not been described in more detail in the present specification.

It will be readily appreciated that the invention is not limited to all the details of the circuit described with reference to the drawing.

Thus, instead of providing a linear decrease in the value of the signal in line 21 during the final approach to the selected set-down position, an auxiliary position signal may be arranged to be produced a short distance before each arm-deposition position is reached, and to effect a reduction of the motor-energising voltage and thus of the speed of the pickup arm immediately preceding the attainment of the selected arm-deposition position.

What we claim is:

1. Electrical equipment for producing and controlling, in a disc-record-player having a record turntable and a pickup member for co-operation with a record disc placed on the turntable, horizontal movement of the pickup member towards and away of the axis of the turntable and up-and-down movement of the pickup member, said equipment comprising: a variable-speed electric motor means which, when connected to a source of electric power, produces such horizontal movement of the pick-up member in one or the other of two opposite directions, according to the manner of its connection to such source; a motor-energisation circuit for establishing such connection of said motor to the power source; position-detector means, controlled by the position of the pick-up member resulting from such horizontal movement and operative to respectively produce at each of a plurality of such positions an electric output signal indicative of the respective arm position; position-selector means operative when set for a selected one of said positions of the pick-up member, to complete the motor-energisation circuit for causing said motor means to produce horizontal movement of the pick-up member towards the selected position, and a speed-reference signal of normally constant magnitude, said position-selector means being so associated with said detector means that the output signal of the detector means will produce de-energisation of the motor-energisation circuit when said pick-up member is in said selected position, motor-speed detector means producing a speed signal varying in accordance with the speed of the motor means; motor-speed control means differentially responsive to said motor-speed signal and said speed reference signal and operative to control the motor speed and thus the velocity of the horizontal movement of the pick-up member produced by the motor means, said position-detector means being of the kind which when the pick-up member, in its approach to a selected position, has arrived within a pre-determined distance range from that position, causes said speed reference signal to decrease and thus reduce said velocity in accordance with the decreasing distance from the selected position so that the position-detector means form, with the motor means and the velocity detector means, an approach servo; and electrically operated arm-lifting means operative to ensure that the pick-up member is in a raised position while the motor means is energised from such source to produce such horizontal movement, and to allow the pick-up member to be deposited on to a record resting on the turntable, or to other support means, when such horizontal movement has been stopped at such selected position.

2. Electrical equipment as claimed in claim 1, wherein said position-detector means are of the kind which, within said predetermined range, varies the speed-reference signal in accordance with a linear function of the algebraic value of the distance of the pick-up member from the selected position.

* * * * *